(12) United States Patent
Wipf

(10) Patent No.: US 6,591,963 B2
(45) Date of Patent: Jul. 15, 2003

(54) STORAGE APPARATUS

(75) Inventor: Alfred Wipf, Jestetten (DE)

(73) Assignee: SIG Pack Systems AG (CH)

( * ) Notice: Subject to any disclaimer, the term of this patent is extended or adjusted under 35 U.S.C. 154(b) by 0 days.

(21) Appl. No.: 10/154,374

(22) Filed: May 23, 2002

(65) Prior Publication Data

US 2002/0195317 A1 Dec. 26, 2002

(30) Foreign Application Priority Data

Jun. 26, 2001 (CH) ..................... 2001 1167/01

(51) Int. Cl.[7] ................................. B65G 1/00
(52) U.S. Cl. ................. 198/347.2; 198/594; 198/812
(58) Field of Search ............... 198/347.2, 594, 198/812, 347.3

(56) References Cited

U.S. PATENT DOCUMENTS

| | | | |
|---|---|---|---|
| 4,413,724 A | | 11/1983 | Fellner |
| 4,513,858 A | * | 4/1985 | Fellner et al. ............... 198/812 |
| 4,549,647 A | | 10/1985 | Cosse |
| 5,490,589 A | * | 2/1996 | Golz et al. ................. 198/444 |
| 5,772,005 A | | 6/1998 | Hänsch |
| 6,016,904 A | * | 1/2000 | Hammock et al. .......... 198/812 |
| 6,152,291 A | | 11/2000 | Steeber et al. |

FOREIGN PATENT DOCUMENTS

| | | |
|---|---|---|
| CH | 690 646 | 5/1995 |
| DE | 32 25 714 | 1/1984 |
| DE | 42 24 609 | 7/1992 |
| DE | 198 56 649 | 6/2000 |
| EP | 0 581 143 | 2/1994 |
| FR | 2 810 653 | 12/2001 |

OTHER PUBLICATIONS

European Search Report, EP Application No. 02405504.8–2308.

* cited by examiner

Primary Examiner—Christopher P. Ellis
Assistant Examiner—Richard Ridley
(74) Attorney, Agent, or Firm—Harness, Dickey & Pierce, P.L.C.

(57) ABSTRACT

Storage apparatus has a carriage which can be displaced along a conveying plane, while deflecting rollers subdivide an endless conveyer into a storage strand and an idle strand. A first deflector deflects the idle strand from the conveying plane into a parallel plane spaced apart therefrom while a second deflector is used to transfer the deflected idle strand into the storage strand. The storage apparatus provides space-saving and high-capacity storage without belt crossovers.

8 Claims, 5 Drawing Sheets

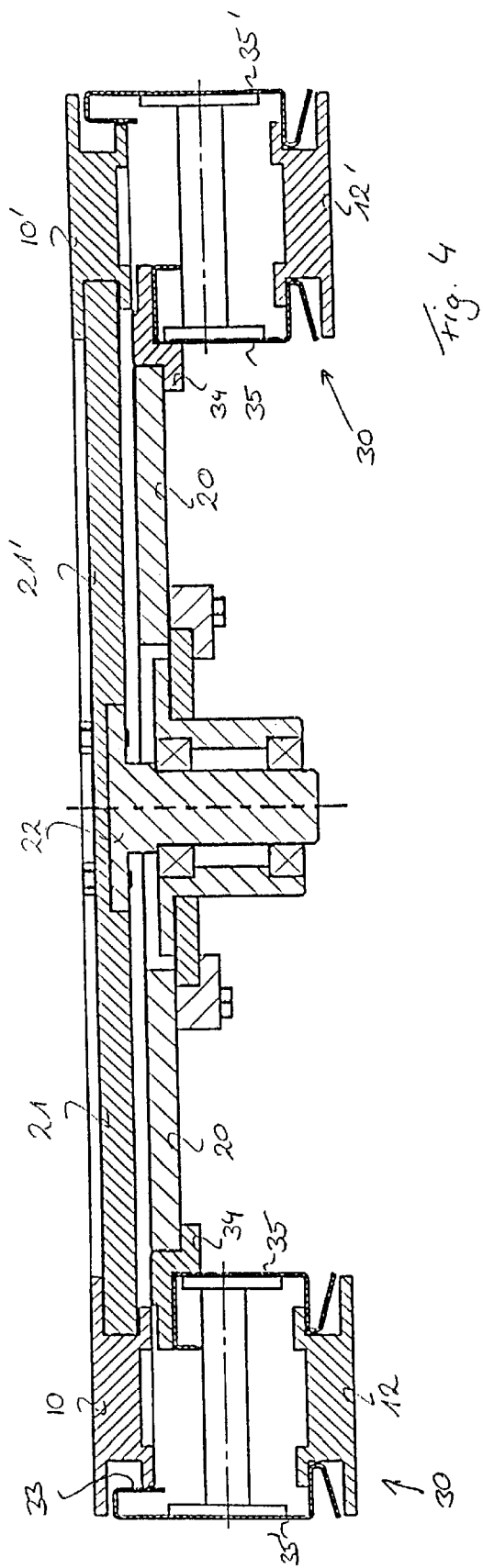
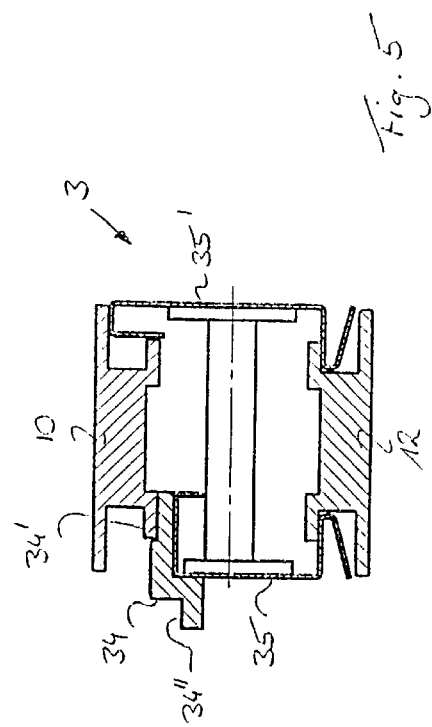

STORAGE APPARATUS

TECHNICAL FIELD

The invention relates to a storage apparatus for storing goods conveyed along a conveying section from an entry station to an exit station.

PRIOR ART

A storage apparatus of the generic type is known from U.S. Pat. No. 4,413,724. A conveying belt is guided in loop form around a plurality of deflecting rollers arranged in a conveying plane. Some of the deflecting rollers are arranged in pairs on carriages which can be displaced in the conveying plane. This makes it possible to form storage and idle strands, it being possible for the length of the latter, and thus the capacity of the store, to be changed by virtue of the carriages being displaced. This storage apparatus requires a relatively large amount of space.

DE-A-42,24,609 describes a conveying apparatus for cigars in the case of which a conveying belt is conveyed in two concentric helixes arranged with the same pitch about a common vertical axis. In order to change the length of the conveying section, there is provided a bridge element which connects the two helixes, and thus bridges the conveying section, and can be displaced relative to the two helixes. The helical arrangement does indeed save space, but has the disadvantage of the necessary belt crossover, which always involves the risk of the position and spacing between the goods transported being changed.

Further storage apparatuses, which all nevertheless also have belt transitions, are known, for example, from DE-A-198,56,649, U.S. Pat. Nos. 6,152,291, 4,549,647 and CH-A-690,646.

DESCRIPTION OF THE INVENTION

The object of the invention is thus to provide an improved storage apparatus of the type mentioned in the introduction which is space-saving and nevertheless does not require any belt crossovers.

This object is achieved by a storage apparatus having the features of patent claim 1.

This storage apparatus according to the invention has a carriage, which can be displaced along a conveying plane, with deflecting rollers for subdividing an endless conveying means into a storage strand and an idle strand. The invention provides first deflecting means, which deflect the idle strand from the conveying plane into a parallel plane spaced apart therefrom, and second deflecting means, in order to transfer the deflected idle strand, in turn, into said conveying plane or some other conveying plane into a storage strand.

Since the idle strand thus runs in the conveying plane and, as it were, on the rear side thereof, it is the case that, with maximum storage capacity in the conveying plane, no additional space is required for the idle strand. Furthermore, this arrangement allows high flexibility in the geometrical configuration of the storage apparatus. In particular, it is possible for the storage apparatus to be arranged in one plane or in a helical manner. Furthermore, it is advantageous that, even in the case of a helical arrangement, no belt crossovers are necessary.

In a preferred embodiment, the conveying means is an endless plate link chain. This has the advantage that cavities for accommodating piece goods which are to be transported may be arranged on it. In addition, it allows straightforward guidance.

In a further preferred embodiment, the conveying means, preferably a plate link chain, is only guided on one side in the region of the deflecting rollers, in order to simplify the deflection, with the result that it is possible to operate at relatively high speeds.

Further advantageous embodiments can be gathered from the dependent patent claims.

BRIEF DESCRIPTION OF THE DRAWINGS

The subject matter of the invention is explained herein below with reference to preferred exemplary embodiments which are illustrated in the attached drawings, in which:

FIG. 4 shows a cross section through a guide according to FIG. 1, along A—A;

FIG. 5 shows a cross section through the guide according to FIG. 1 along B—B;

PREFERRED EMBODIMENTS OF THE INVENTION

Figure 1:
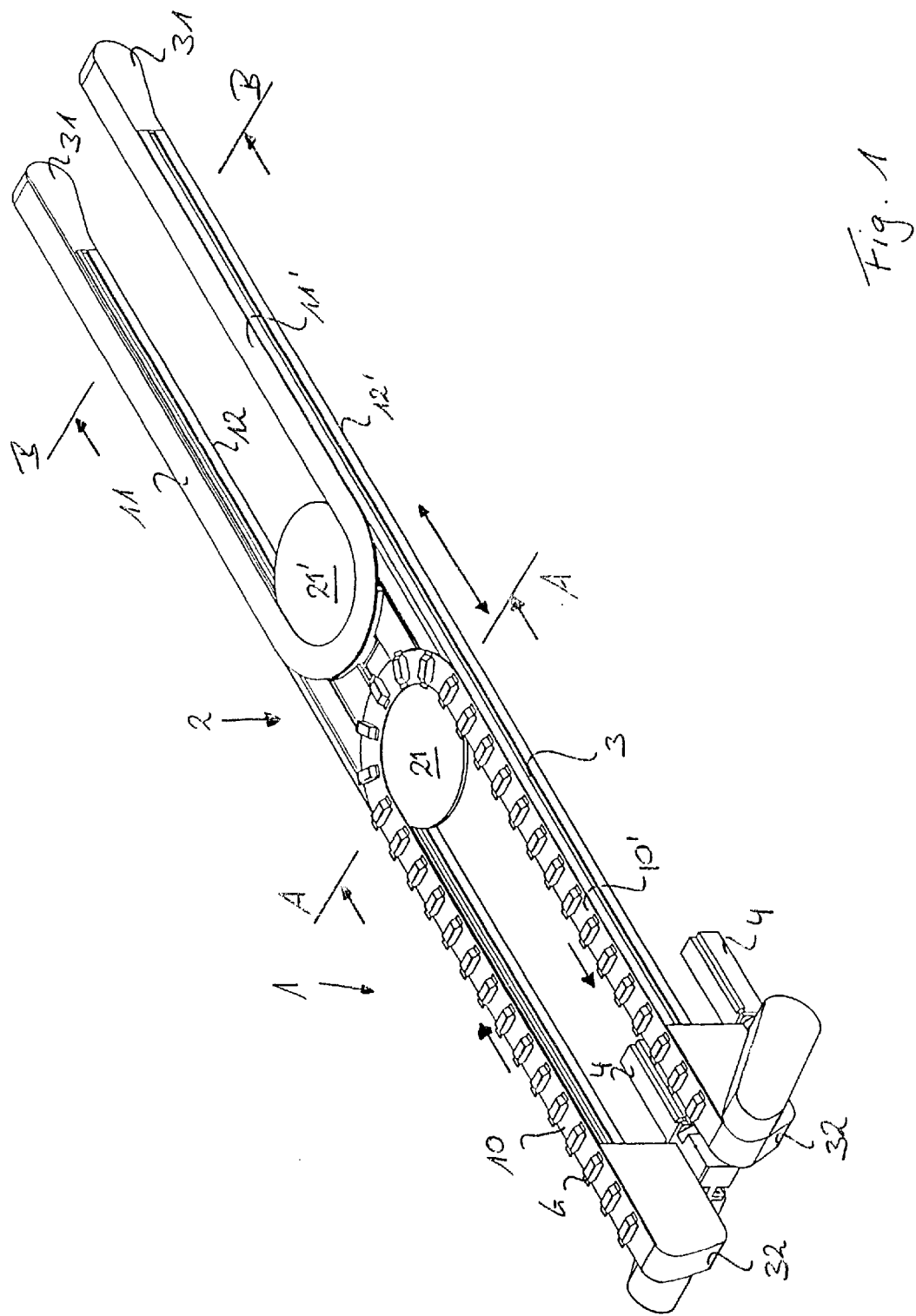
FIG. 1 shows a plan view of a storage apparatus according to the invention in a first storage position.
Figure 2:
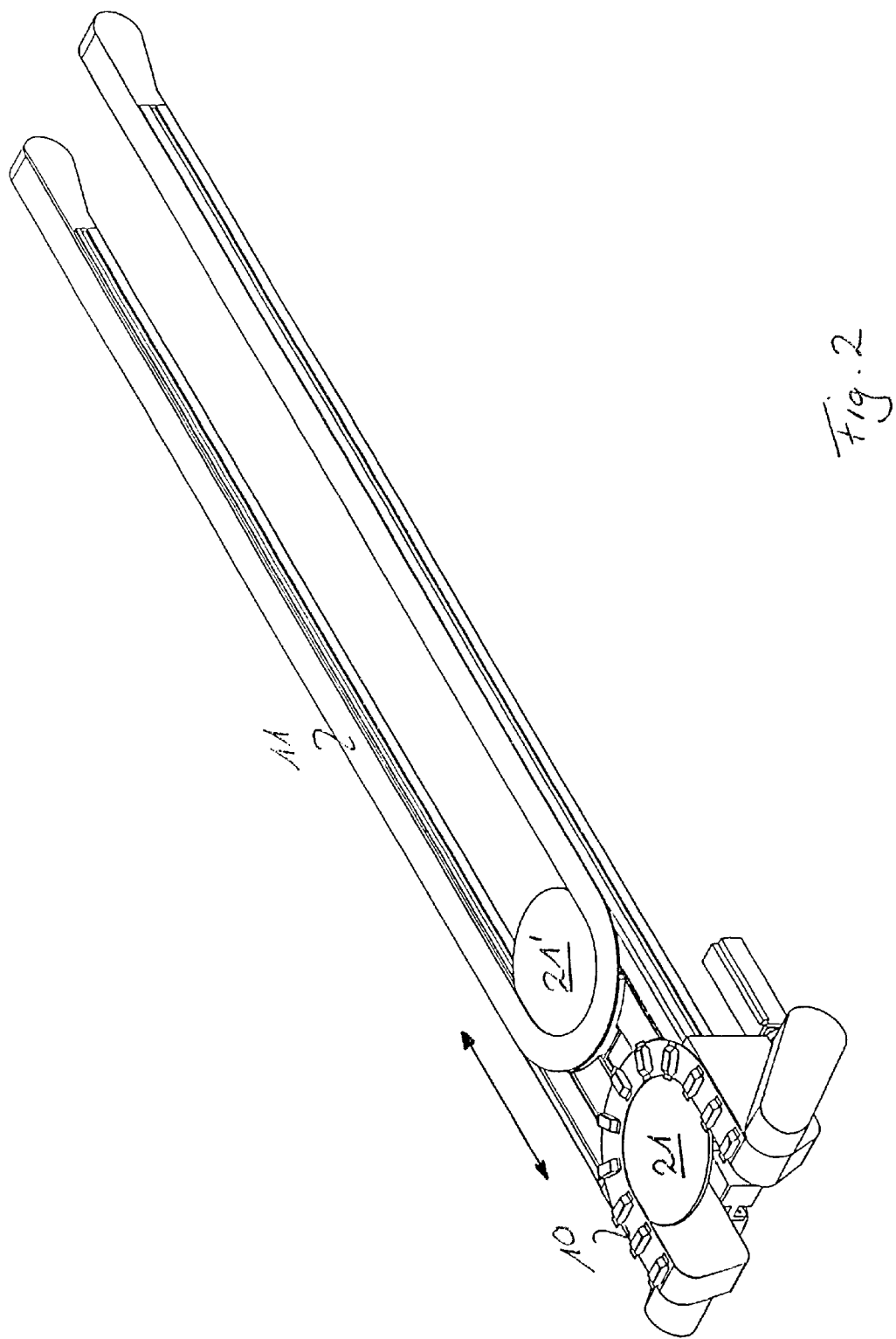
FIG. 2 shows the storage apparatus according to FIG. 1 in a second storage position.

FIGS. 1 and 2 show a first embodiment of a storage apparatus according to the invention. A single, endless and flexible conveying means 1, for example a conveying belt or a plate link chain, is arranged on a horizontally arranged carrier frame 3 with two carrier elements 30 running parallel to one another. Said conveying means 1 transports piece goods G from an entry station (not illustrated here) to an exit station (not illustrated either). The entry station is connected, for example, to a production location and the exit station is connected to a packaging unit.

In the carrier frame 3, a carriage 2 is mounted such that it can be displaced along a straight line. The displaceability is indicated in FIGS. 1 and 2 by a double-sided arrow. Arranged on a top side of the carriage 2 are two deflecting rollers 21, 21', around which the conveying means 1 is guided. The conveying means 1 is thus subdivided, on this top side, into two loops, which form a common conveying plane. A first loop forms a storage strand and the second loop forms part of an idle strand. The movement direction of the conveying means 1, and thus the conveying direction, is illustrated by single arrows. Means for tensioning the conveying means 1 are preferably provided on the carriage 2. For example, the deflecting rollers 21, 21' may be mounted in a mutually resilient manner.

As can be seen in FIG. 1, the first deflecting roller 21 subdivides the storage strand into an entry-side storage strand 10 and an exit-side storage strand 10'. The second deflecting roller 21' subdivides the idle strand into an entry-side top idle strand 11 and an exit-side top idle strand 11'. As a result, the storage strand and the idle strand are subdivided, in the conveying plane, into two portions which run parallel to one another and are operated in opposite directions.

A first deflecting means 31 in each case deflects a top idle strand 11, 11' in each case around the carrier frame 3 into a plane which runs parallel to, and is spaced apart from, the conveying plane and, in the former plane, said idle strand runs as a deflected, bottom idle strand 12, 12' along the entire underside of the carrier frame 3. In another embodiment, which is not illustrated here, the carrier frame is oriented at an angle to the horizontal or vertical, with the result that the idle strand is deflected onto the rear side of the carrier frame 3. The deflected idle strand 12, 12' is transferred into the storage strand 10, 10' via second deflecting means 32.

The first and/or second deflecting means 31, 32 are motor-driven. In the example illustrated here, it is the second deflecting means 32 which are motor-driven, the two deflecting means 32 each being operatively connected to a motor 4, with the result that the entry-side region and the exit-side region of the conveying means 1 can be driven independently of one another. Driving generally takes place via a control unit which controls the conveying process and is in communicative connection with the entry and exit stations. If the regions are driven differently, then the carriage 2 is moved either toward the entry station or toward the exit station. As a result, the length of the storage strand 10, 10' changes, as does the storage capacity of the storage apparatus. In FIG. 1, half the store is utilized, and in FIG. 2 it is required to a minimal extent.

Figure 3:
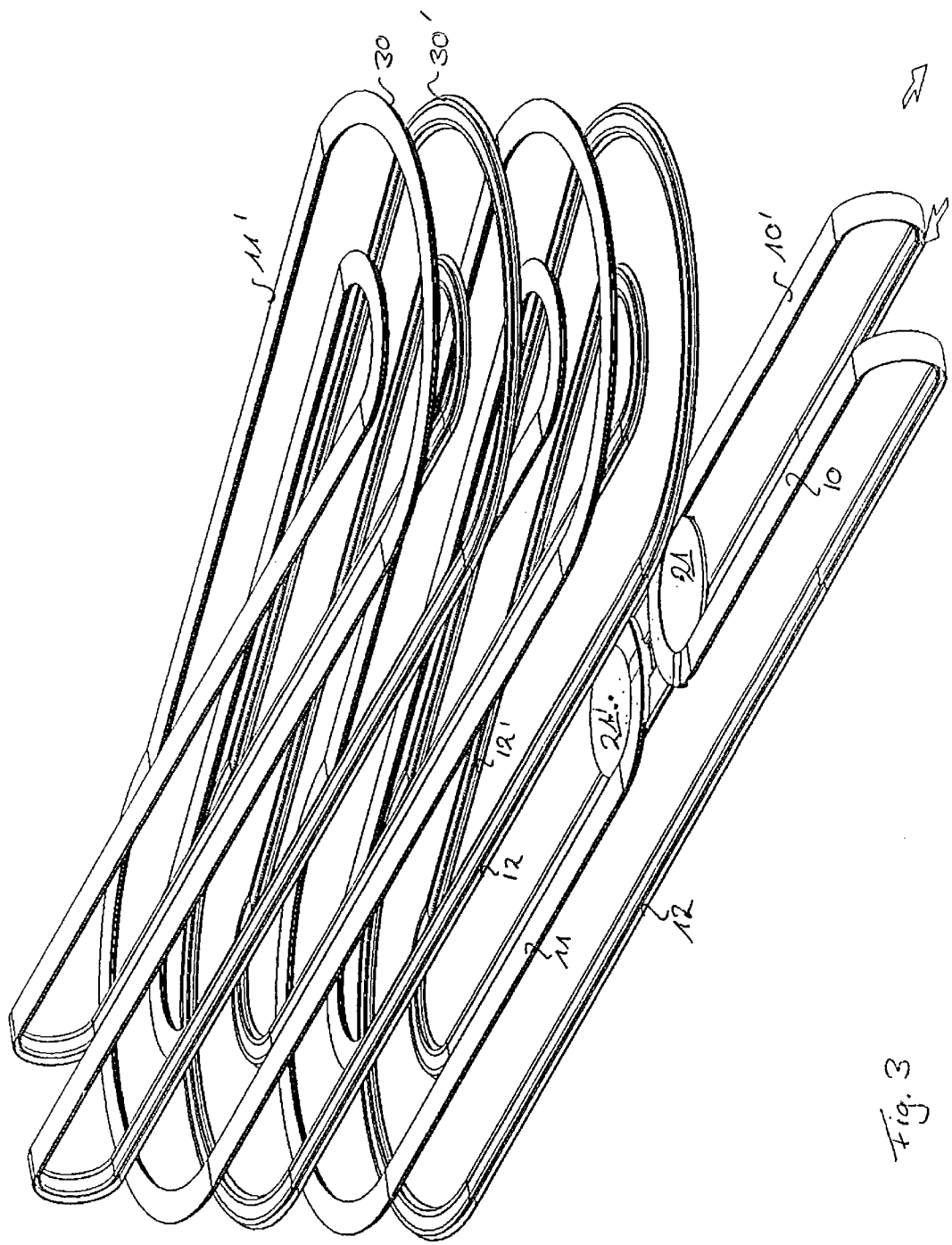
FIG. 3 shows a plan view of the second embodiment of the storage apparatus according to the invention.

FIG. 3 illustrates a second embodiment of the apparatus according to the invention. Here, the carrier frame 3 is wound helically, it being the case, in turn, that the loop-like storage strand 10, 10' is mounted on two top carrier elements 30, running parallel to one another, and the bottom deflected idle strand 12, 12' runs on two bottom carrier elements 30', likewise running parallel to one another. The carrier elements 30, 30' are preferably arranged such that a bottom carrier element 30' is arranged, with constant spacing, beneath each top carrier element 30. The carrier frame 3 may also be designed such that a top and a bottom carrier element 30, 30' in each case are formed in one piece. In addition, the two top and/or the two bottom carrier elements 30, 30' may be connected to one another, as long as sufficient space remains for the displacement of the carriage 2.

It is preferable for the conveying means 1 to be mounted such that it is guided at at least two locations at least in the conveying plane, but preferably over at least more or less the entire course of the conveying means 1. In the region of the deflecting rollers 21, 21', however, the conveying means 1 is released from at least one of these guides, in order to allow detachment from the carrier elements 30 and simplified deflection.

A preferred embodiment for this guidance is illustrated in FIGS. 4 and 5. According to FIG. 5, the conveying means 1, in this case a plate link chain, is guided on both sides in the carrier frame 3. On its inner side, which is directed toward the carriage 2, the carrier frame is provided with a stepped support 34. The support 34 extends at least more or less over the entire length of the carrier frame 3, it being possible for it to be continuous or to have interruptions. The entry-side storage strand 10 rests on a first step 34'. Of course, the exit-side storage strand 10' and the top idle strands 11, 11' also rest on the first step 34'. The support 34 preferably has a second step 34", on which the carriage 2 rests by way of a carrier plate 20 and is guided.

On its outer side, which is directed away from the carriage 2, the carrier frame 3 is provided with a lateral guide 33. In the exemplary embodiment illustrated in FIGS. 4 and 5, the carrier frame 3 is provided with a covering plate 35, 35' on both sides, an outer covering plate 35' being bent in rectangular form at the top end, with the result that the plate link chain, on its plate link underside, bears against a first leg of the covering plate 35' and rests on a second leg of the covering plate 35'. The stepped support 34 is arranged on the second covering plate 35. The bottom ends of the two plates 35, 35' are preferably bent at an angle, with the result that they engage in lateral grooves 13 of the plate link chain and thus guide and bear the latter. Other methods of bearing the top strand laterally and of bearing and guiding the bottom strand are possible.

When a plate of the plate link chain 1 passes to the carriage 2, then, as is illustrated in FIG. 4, one of the deflecting rollers 20 or 21 engages in the inner lateral groove 13 of the plate and raises the plate, and thus the conveying means 1, over an edge of the stepped support 34 and dispenses with said guidance.

Figure 6:
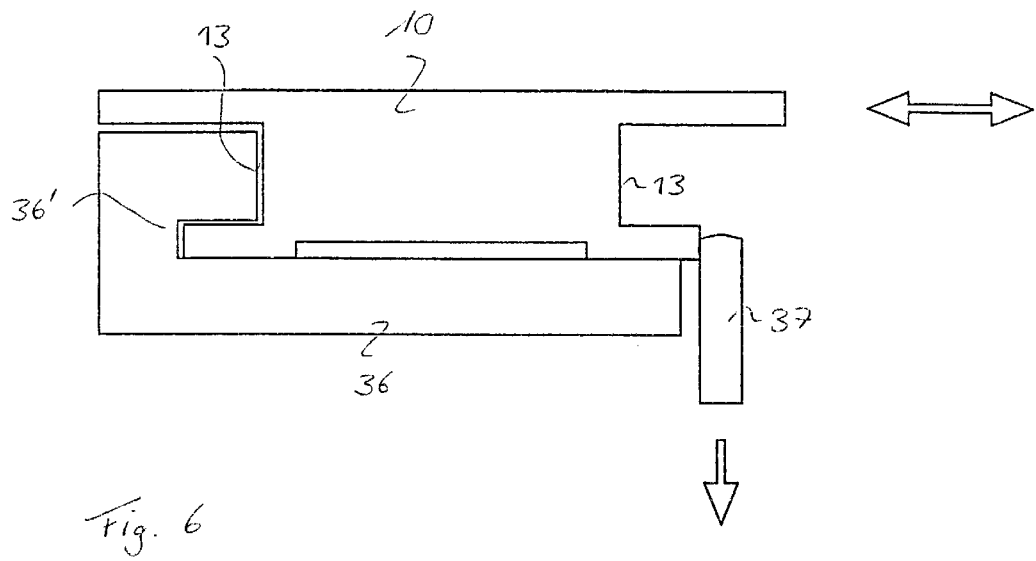
FIG. 6 shows a cross section through a second embodiment of a guide of a conveying means.

FIG. 6 illustrates a further method of guiding the top strand. The bottom strand may be guided and mounted the same or differently, for example as has been described above. The top strand, once again represented here by the entry-side storage strand 10, is mounted on a support plate 36. On its outer side, the support plate 36 has a lateral guide 36', in which a bottom leg 14 of the plate link engages. A lateral guide 37, which can be lowered in part, is likewise arranged on the inner side of the carrier frame 3. This guide is preferably formed by individual vertically upright, resilient teeth which can be lowered by means of a nose fitted on the carriage 2. Here too, the deflecting roller 21, 21', in turn, engages in the groove 13 of the link plate, but it need not be raised up out of the conveying plane.

Figure 7:
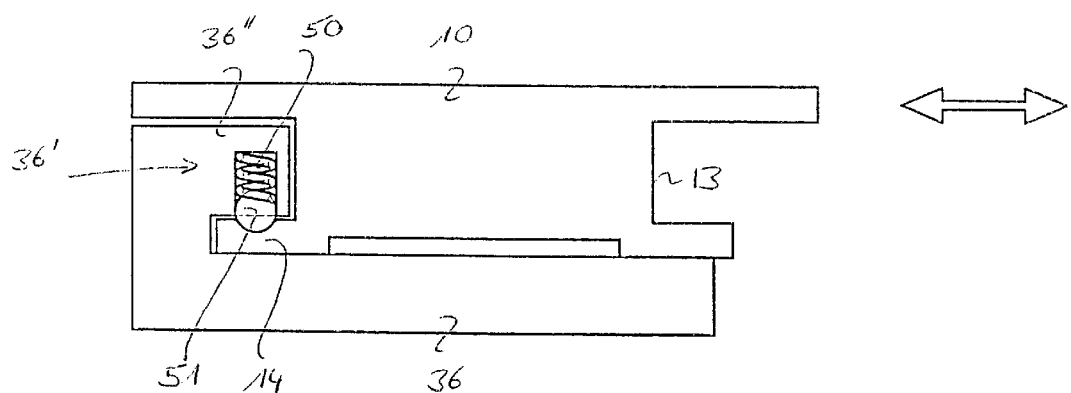
FIG. 7 shows a cross section through a third embodiment of a guide of a conveying means.

FIG. 7 illustrates a further embodiment of the guide for the top strand. Here too, a lateral guide 36' is provided on the outside. There is no guide provided on the inside. Precise guidance, however, is achieved in that arranged in a top leg 36" of the guide 36' is a spring element 50, which forces the bottom leg 14 of the link plate onto the support surface of the support plate 36. The bottom leg 14 is preferably operatively connected to the spring element 50 via a ball 51. The spring action is deactivated mechanically or electronically in the region of the carriage, with the result that the plate link, in turn, can be moved out of the guide 36'.

By virtue of the rear-side guidance of the idle strand, the apparatus according to the invention makes possible space-saving and high-capacity storage without any belt cross-overs.

List of Designations

1 Conveying means
10 Entry-side storage strand
10' Exit-side storage strand
11 Entry-side top idle strand
11' Exit-side top idle strand
12 Entry-side bottom idle strand
12' Exit-side bottom idle strand
13 Groove
14 Bottom leg
2 Carriage
20 Carrier plate
21 First deflecting roller
21' Second deflecting roller
22 Wheel mount
3 Carrier frame
30 Top carrier element
30' Bottom carrier element
31 First deflecting means
32 Second deflecting means
33 Lateral guide 34 Stepped support
34' First step
34" Second step
35 Inner covering plate
35' Outer covering plate
36 Support plate
36' Guide
36" Top leg
37 Inner lateral guide
4 Motor
50 Spring element
51 Ball bearing
G Piece goods

What is claimed is:

1. A storage apparatus for storing goods conveyed along a conveying section from an entry station to an exit station, having a flexible conveying means, it being the case that the conveying means comprises a storage strand and an idle strand, that the storage strand and at least one part of the idle strand run in at least one common conveying plane, and that the storage strand and the least one part of the idle strand, in this at least one common conveying plane, have in each case two portions which run parallel to one another in a conveying direction and are operated in opposite directions, having a carriage which can be displaced in the conveying plane and is intended for changing a storage capacity of the storage apparatus, it being the case that the carriage has a first deflecting roller for deflecting the storage strand, and a second deflecting roller for deflecting the idle strand, in the at least one conveying plane, and having first and second deflecting means for deflecting the conveying means, wherein the first deflecting means deflect the idle strand from the at least one conveying plane into a parallel plane spaced apart therefrom, and wherein the second deflecting means transfer the deflected idle strand into the storage strand, wherein the first and/or the second deflecting means are motor-driven and wherein there are provided a first and second deflecting means on the entry side and exit side, the entry-side and the exit-side deflecting means being driven independently of one another.

2. The storage apparatus as claimed in claim 1, wherein the carriage can be displaced along a straight line.

3. The storage apparatus as claimed in claim 1, wherein the carriage can be displaced along a helical path.

4. The storage apparatus as claimed in claim 1, wherein the conveying means is a plate link chain.

5. A storage apparatus for storing goods conveyed along a conveying section from an entry station to an exit station, having a flexible conveying means, it being the case that the conveying means comprises a storage strand and an idle strand, that the storage strand and at least one part of the idle strand run in at least one common conveying plane, and that the storage strand and the least one part of the idle strand, in this at least one common conveying plane, have in each case two portions which run parallel to one another in a conveying direction and are operated in opposite directions, having a carriage which can be displaced in the conveying plane and is intended for changing a storage capacity of the storage apparatus, it being the case that the carriage has a first deflecting roller for deflecting the storage strand, and a second deflecting roller for deflecting the idle strand, in the at least one conveying plane, and having first and second deflecting means for deflecting the conveying means, wherein the first deflecting means deflect the idle strand from the at least one conveying plane into a parallel plane spaced apart therefrom, and wherein the second deflecting means transfer the deflected idle strand into the storage strand, wherein the conveying means is guided at at least two locations in the at least one conveying plane, the conveying means being released from at least one of theses guides in the region of the deflecting rollers.

6. The storage apparatus as claimed in claim 5, wherein the conveying means is guided on a stepped support, it being possible for the conveying means to be raised above an edge of a step in the region of the deflecting rollers.

7. The storage apparatus as claimed in claim 5, wherein the conveying means is mounted in a guide on one side and, on the other side, is adjacent to a side guide which can be lowered in the region of the deflecting rollers.

8. A storage apparatus for storing goods conveyed along a conveying section from an entry station to an exit station, having a flexible conveying means, it being the case that the conveying means comprises a storage strand and an idle strand, that the storage strand and at least one part of the idle strand run in at least one common conveying plane, and that the storage strand and the least one part of the idle strand, in this at least one common conveying plane, have in each case two portions which run parallel to one another in a conveying direction and are operated in opposite directions, having a carriage which can be displaced in the conveying plane and is intended for changing a storage capacity of the storage apparatus, it being the case that the carriage has a first deflecting roller for deflecting the storage strand, and a second deflecting roller for deflecting the idle strand, in the at least one conveying plane, and having first and second deflecting means for deflecting the conveying means, wherein the first deflecting means deflect the idle strand from the at least one conveying plane into a parallel plane spaced apart therefrom, and wherein the second deflecting means transfer the deflected idle strand into the storage strand, wherein the conveying means is mounted in a guide, it being forced by a spring onto a support surface, and the spring action being eliminated in the region of the deflecting rollers.

* * * * *